United States Patent [19]
Sadowsky

[11] Patent Number: 6,123,737
[45] Date of Patent: *Sep. 26, 2000

[54] PUSH DEPLOYMENT OF SOFTWARE PACKAGES USING NOTIFICATION TRANSPORTS

[75] Inventor: Richard Sadowsky, San Jose, Calif.

[73] Assignee: Symantec Corporation, Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/861,177

[22] Filed: May 21, 1997

[51] Int. Cl.[7] .................................................. G06F 9/445
[52] U.S. Cl. ................................. 717/11; 717/4; 717/5; 717/6; 717/7; 717/8; 717/9; 717/10
[58] Field of Search .................................. 395/712, 704, 395/705, 706, 707, 708; 717/10, 9

[56] References Cited

U.S. PATENT DOCUMENTS

| | | | |
|---|---|---|---|
| 5,406,577 | 4/1995 | Baudoin | 370/407 |
| 5,421,009 | 5/1995 | Platt | 395/600 |
| 5,452,099 | 9/1995 | Von Meister | 358/403 |
| 5,708,780 | 1/1998 | Levergood et al. | 395/200.59 |
| 5,748,738 | 5/1998 | Bisbee et al. | 380/25 |
| 5,768,528 | 6/1998 | Stumm | 395/200.61 |
| 5,790,790 | 8/1998 | Smith et al. | 395/200.36 |
| 5,875,296 | 2/1999 | Shi et al. | 395/188.01 |
| 5,907,547 | 5/1999 | Foladare et al. | 370/352 |
| 5,970,468 | 10/1999 | Bull | 705/11 |
| 5,974,449 | 10/1999 | Chang et al. | 709/206 |
| 5,978,842 | 11/1999 | Noble et al. | 709/218 |

OTHER PUBLICATIONS

Salvatore, S., "Electronic Software Distribution: Diamond in the Rough", *Data Communications*, vol. 22, No. 4, Mar. 1, 1993, pp. 109–110, 112, 114, 116, New York, U.S.A.

Troke, L., "Configuration, Installation and Distribution—A Structured Approach to Software Distribution for Client/Server" (Share Europe AM93:2.2E), Oct. 25, 1993, pp. 893–905, IBM, Nottingham, England.

BackWeb; A Cooperative Architecture for a Flexible "Push–Pull" Broadcasting Solution, Mar. 7, 1997, U.S.A. (published on the WorldWideWeb).

BackWeb, 'A Cooperative Architecture For a Flexible "Push–Pull" Broadcasting Solution', U.S.A. published on WWW, Mar. 1997.

*Primary Examiner*—Tariq R. Hafiz
*Assistant Examiner*—Ted T. Vo
*Attorney, Agent, or Firm*—Fenwick & West LLP

[57] ABSTRACT

A system and method for deploying one or more software packages (18) over a communications interface (1). A push trigger (10) is sent to a server computer (2). In response to the trigger (10), the server computer (2) generates a notification package (12, 13, 14). The notification package (12, 13, 14) is sent over the communications interface (1) to at least one client computer (2). Each client computer (2) contains at least one notification transport (15, 16, 17) which recognizes a corresponding notification package (12, 13, 14). The notification transport (15, 16, 17) then instructs the server computer (2) to automatically push the software package (18) to the client computer (4) over the communications interface (1). E-mail transport (15), UNC transport (16), and opportunistic transport (17) are described.

13 Claims, 5 Drawing Sheets

PUSH DEPLOYMENT OF SOFTWARE PACKAGES USING NOTIFICATION TRANSPORTS

RELATED APPLICATION

A related patent application is U.S. patent application Ser. No. 08/664,388 filed Jun. 14, 1996 by Richard Scott Sadowsky entitled "Use of Polymorphic Package Files to Update Software Components", which patent application is hereby incorporated by reference in its entirety into the present patent application.

TECHNICAL FIELD

This invention pertains to the field of using push technology to deploy software packages from at least one server computer to at least one client computer.

BACKGROUND ART

A software product known as BackWeb is a product that manages software updates using push installation. However, unlike the present invention, BackWeb uses an HTTP connection, which requires access to the World Wide Web component of the Internet. The present invention is not so limited. For example, the present invention can work on top of conventional e-mail systems in environments where access to the World Wide Web is not available. E-mail is currently used by over 70 million users worldwide; and provides for a fast, convenient, automatic, and inexpensive way to deploy software updates. Furthermore, the present invention employs true push technology unlike BackWeb, which pulls on a given "channel", i.e., BackWeb looks at a given URL (Universal Resource Locator). In the e-mail embodiment of the present invention, messages are queued and processed efficiently by the e-mail post office, and the user need not maintain constant access to the Internet. Another advantage of the present invention over BackWeb is that the Backweb client software is over 4 megabytes in size, whereas the present invention's agent software is under one megabyte. Finally, the present invention, unlike BackWeb, does not subject the user to viewing vendors' advertisements.

DISCLOSURE OF INVENTION

The present invention is a system and method for deploying a software package (18) over a communications interface (1). The method comprises the steps of sending a trigger (10) to a server computer (2). In response to the trigger (10), the server computer (2) generates a notification package (12, 13, 14). The notification package (12, 13, 14) is sent over the communications interface (1) to at least one client computer (4). The notification package (12, 13, 14) is recognized by a notification transport (15, 16, 17) located within each client computer (4).

The notification transport (15, 16, 17) then instructs the server computer (2) to automatically push the software package to the client computer (4) over the communications interface (1).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
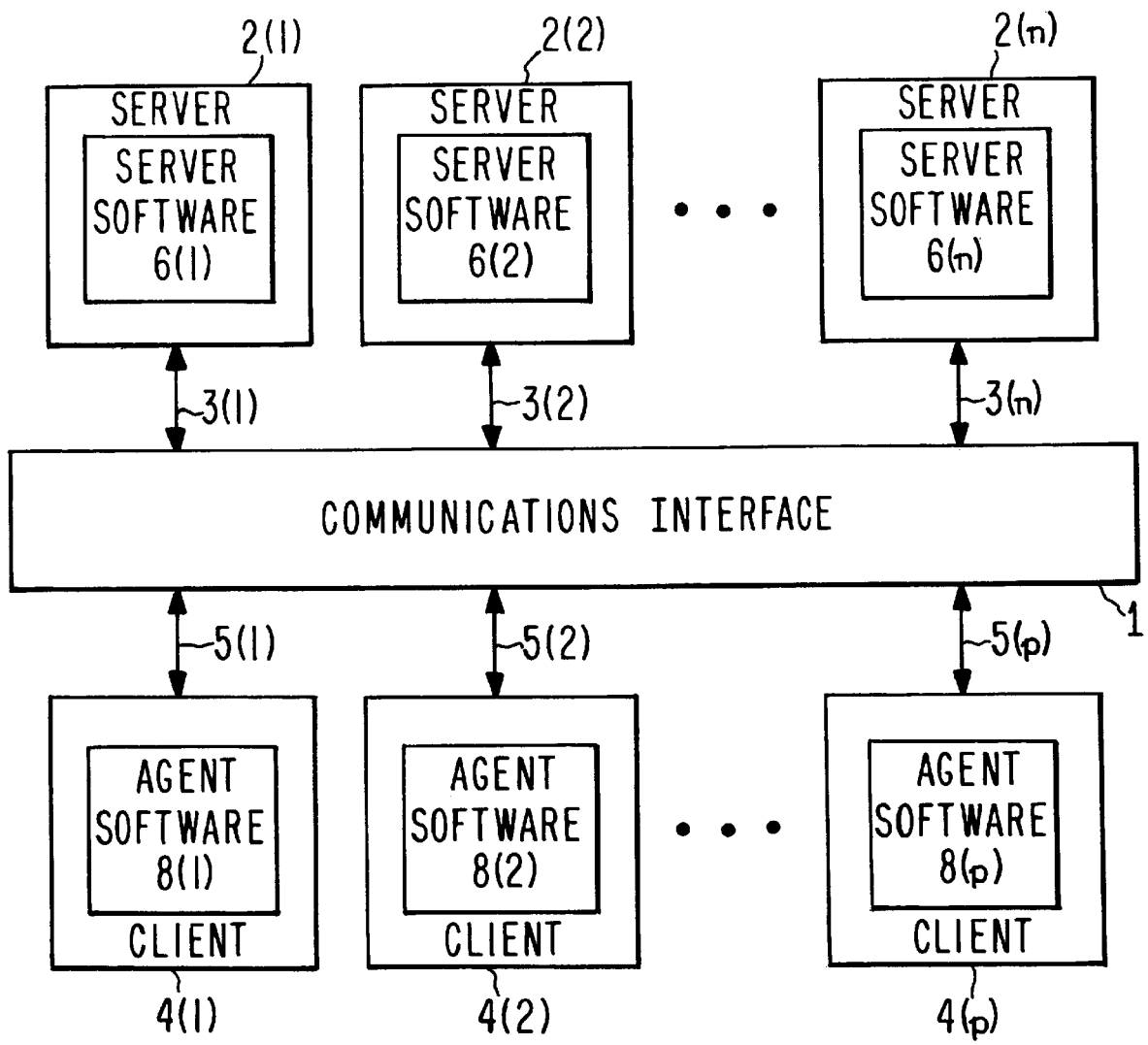
FIG. 1 is a block diagram of a computer system architecture that may advantageously use the present invention.

FIG. 1 illustrates an operating environment in which the present invention may advantageously be employed. One or more server computers 2 are coupled to a communications interface 1 via links 3. Communications interface 1 may be any communications interface, such a direct modem connection, the Internet, an intranet, an extranet, or any combination thereof (mixturenet).

Within each server computer 2 is a server software module 6 that has been designed to perform method steps of the present invention. Also coupled to communications interface 1 via links 5 are one or more client computers 4. Within each client computer 4 is an agent software module 8 that has been designed to perform method steps of the present invention.

Links 3 and 5 can be electrically conductive wires, fiber optic cables, wireless links, or any combination thereof. Furthermore, links 3 and 5 can be local or remote links.

Computers 2 and 4 can be any type of computer, and are typically digital computers. In any given system, computers 2 may be similar or identical to each other or may be different. Similarly, computers 4 may be similar or identical to each other or to server computers 2, or may differ therefrom. Server modules 6 and/or agent modules 8 may be implemented in firmware, hardware, and/or software, but for purposes of simplicity will normally be referred to herein as software modules.

Figure 2:
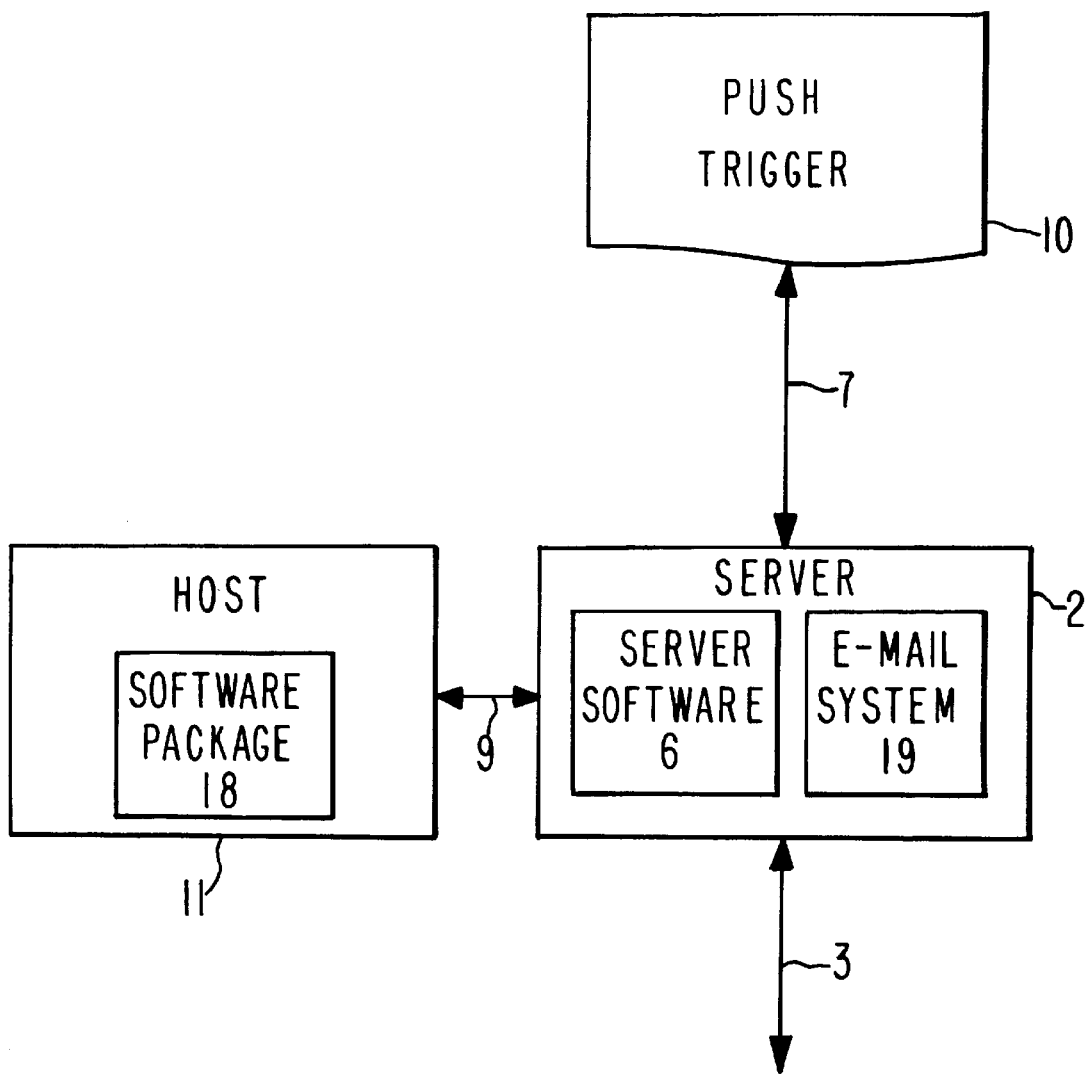
FIG. 2 is a block diagram of components on server computer 2 side of communications interface 1 of the present invention.
Figure 3:
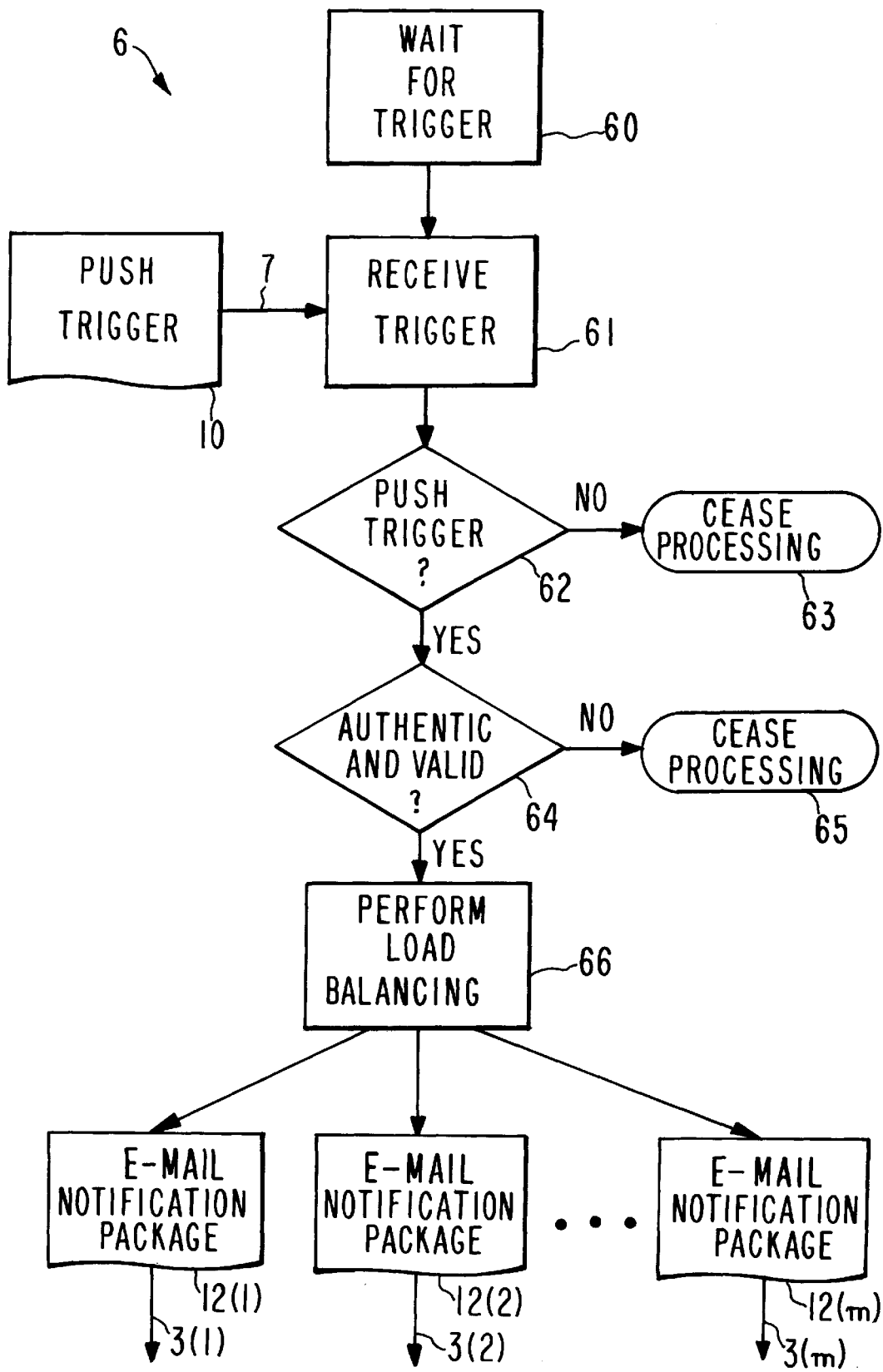
FIG. 3 is a flow chart illustrating method steps that are performed within server computer 2 in a preferred embodiment of the present invention.
Figure 4:
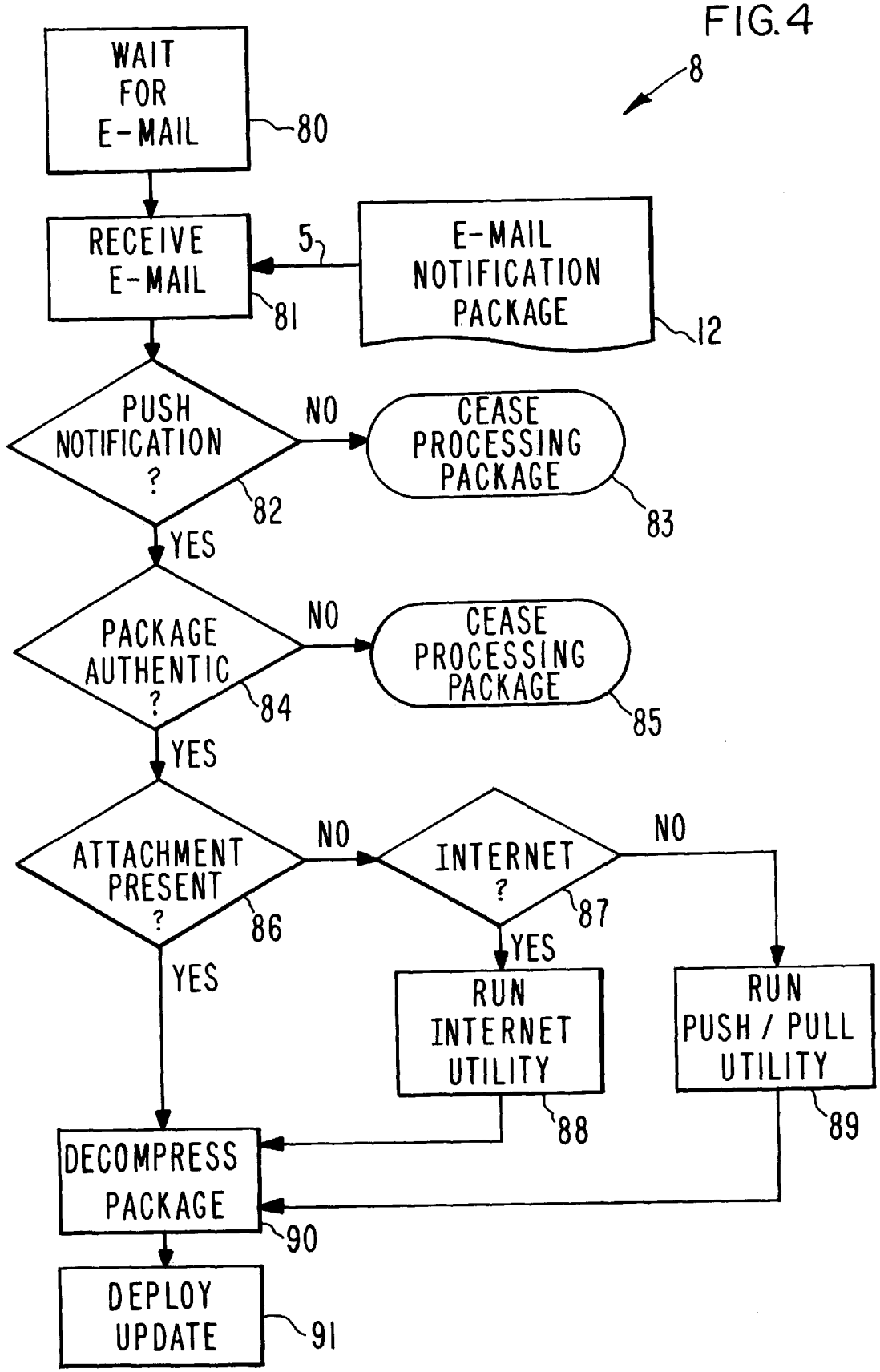
FIG. 4 is a block diagram illustrating method steps that are performed within client computer 4 in a preferred embodiment of the present invention.

FIGS. 2, 3, and 4 illustrate a preferred embodiment of the present invention in which the notification transport is an e-mail (electronic mail) transport 15.

Figure 5:
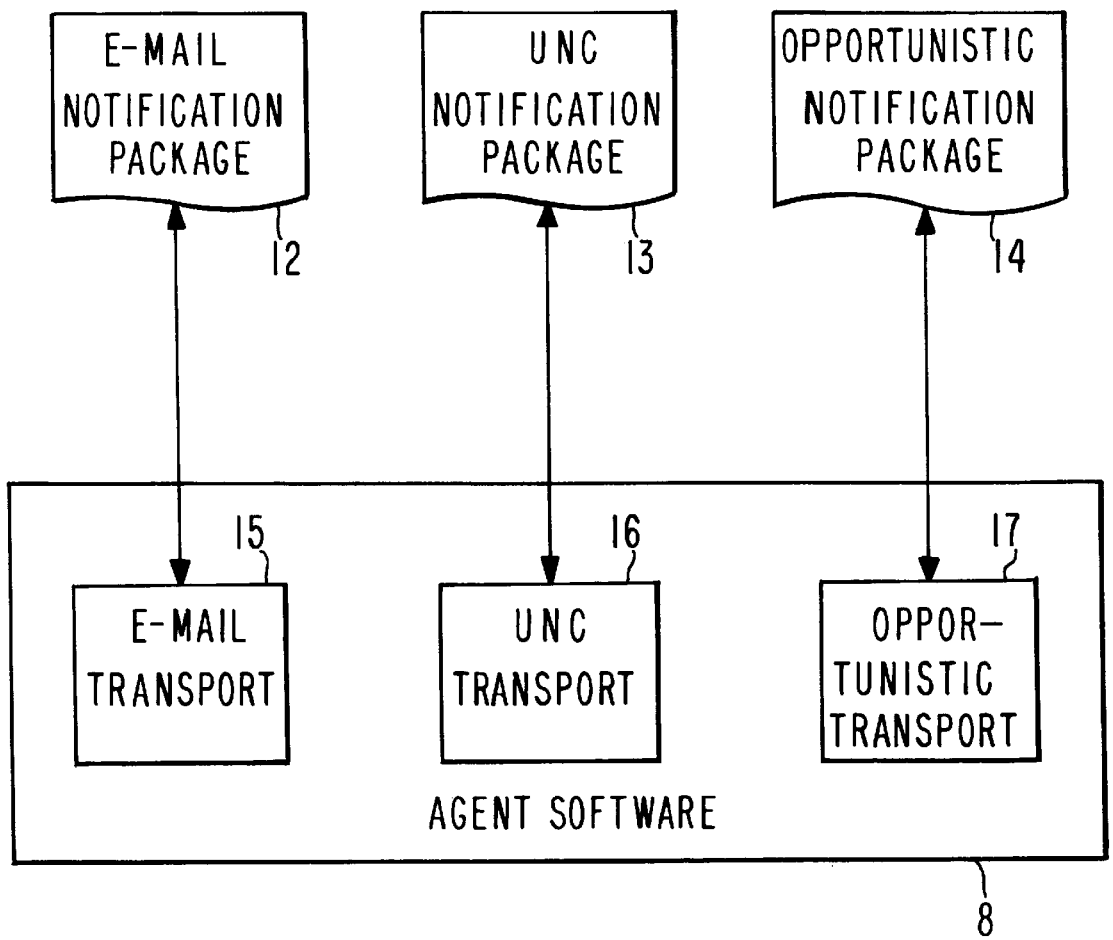
FIG. 5 is a block diagram illustrating a more general embodiment of the present invention.

FIG. 5 illustrates a more general embodiment of the present invention in which a UNC (Universal Naming Convention) transport 16 and an opportunistic transport 17 are also shown.

FIG. 2 illustrates components that are typically present on the server computer 2 side of communications interface 1. Push trigger 10 is a message that is activated upon a certain event, or combination of events, e.g., the end of the month, the presence of new anti-virus information posted within host computer 11, etc.

Trigger 10 can comprise software that has been preprogrammed to trigger upon said event or events. Alternatively, trigger 10 can be generated by a human operator activating some device, such as a computer keyboard.

Trigger 10 may include a set of addresses corresponding to client computers 4 that are intended to receive the corresponding one or more software packages 18.

Trigger 10 is sent over link 7 to server computer 2. Link 7 may be a remote or local link, and may be wired, wireless, or comprise fiber optic cables. Host computer 11 may be part of server computer 2, may be identical with server computer 2, may encompass server computer 2, or may be a standalone computer. Host computer 11 contains one or more software packages 18 that will be deployed to one or more client computers 4.

Each software package 18 may contain a computer program, a software patch, new data, or any combination of these items. A given software package 18 may comprise polymorphic software. When host computer 11 is separate from server computer 2, host computer 11 and server computer 2 communicate with each other via link 9, which may be a remote or local link, and may be wired, wireless, or comprise fiber optic cables. In the embodiment illustrated in FIGS. 2, 3, and 4, server computer 2 contains an e-mail system 19 (which may be an existing system) typically including storage, protocols, address tables, and communications links. For example, e-mail system 19 may be a MAPI (Messaging Application Programming Interface) e-mail system used in conjunction with a Windows 95 or a Windows NT operating system.

FIG. 3 illustrates method steps performed by server software 6. At step 60, software 6 is activated and waits for trigger 10. In an alternative embodiment, software 6 could be dormant and could be activated by trigger 10. At step 61, software 6 receives trigger 10 over link 7. At step 62, software 6 inquires as to whether trigger 10 is a push trigger. Step 62 could be implemented, for example, by having a pre-established field within trigger 10 of predetermined size, where a predetermined sequence of bits indicates a valid push trigger. If trigger 10 is not a valid push trigger, then processing is terminated at step 63. If, on the other hand, trigger 10 is a valid push trigger, step 64 is executed.

At step 64, optional but highly desirable authentication and validity substeps are performed. For example, the authentication substep can establish that a legitimate person and not a spoofer originated push trigger 10. This can be accomplished by having previously encrypted all or a portion of push trigger 10 and having the authentication substep decrypt the previously encrypted information. Alternatively, the authentication could be performed by cryptographic authentication, e.g., by a method of digital signatures. The digital signature ties the contents of a specific software package 18 with the contents of a specific push trigger 10. The digital signature is added to trigger 10. After arrival of trigger 10, software 6 (at step 64) reads the digital signature from trigger 10 and recomputes the digital signature based upon the contents of trigger 10 and the contents of software package 18. If the computed digital signature matches the digital signature stored in trigger 10, then trigger 10 is authentic. If not, trigger 10 is a forgery.

The digital signature can be computed using standard encryption algorithms of arbitrary strength. A message digest can first be created using a one-way hash function such as MD5 or MD52. The message digest is then signed by applying a encryption routine, for example, a block cipher such as Blowfish described in Schneier, *Applied Cryptography* (John Wiley & Sons, Inc. 2d Ed. 1996), pp. 336–339. An advantage of using Blowfish is that it has a variable keylength. Under current U.S. law, the keylength can be arbitrarily strong for use within the United States but must be limited to certain lengths for export outside of the United States. Thus, the variable keylength feature allows software 6 to be modified to provide very strong encryption where allowed by law and yet provide a weaker but exportable form of encryption to restricted countries.

The key used to sign the message digest is calculated by performing operations on software package 18. This binds trigger 10 to the specific software package 18. This ensures that the sending of trigger 10 will not cause access to any other server computer 2, preventing malicious programs from spamming the system. Each trigger 10 must be sent or provoked with knowledge of the software package 18 that is intended.

The optional validation substep within step 64 could, for example, check the address fields within trigger 10 to ensure that these fields are of the correct length and format.

If the authenticity and validity substeps are not satisfactorily passed, processing is terminated at step 65. If the authenticity and validity substeps are passed, control passes to optional step 66.

The output of software 6 is one or more notification packages 12, which, in this particular embodiment, are e-mail notification packages 12. Each notification package 12 contains an address of an intended recipient 4, a notification message, and optionally the software package 18 itself.

Optional step 66 is a load balancing step. Step 66 can be useful when there are many software packages 18 to be deployed and/or many intended recipients 4. Load balancing can comprise batching like notification packages 12 together, introducing time delays into some of the notification packages 12 to avoid overload of the communications interface 1, etc.

FIG. 4 illustrates method steps performed by agent software 8. In step 80, software 8 is activated and waits for receipt of the notification package 12. Alternatively, software 8 could be activated by package 12. However, in the preferred embodiment, software 8 is first activated, which is why it is referred to as agent software rather than client software.

In step 81, software 8 receives the e-mail notification package 12 over link 5.

Step 82 is then entered, wherein a determination is made as to whether the e-mail notification package 12 contains a push notification. This can be done, for example, by examining a pre-established field for a pre-established sequence of bits. If a push notification is not present, processing is terminated at step 83. If a push notification is present, control passes to step 84.

At optional but highly useful step 84, the authenticity of the e-mail notification package 12 is tested. This can be done similarly, identically, or analogously to the authenticity substep described above in conjunction with step 64. If the package 12 is found to be non-authentic, processing is terminated at step 85. If package 12 is found to be authentic, control is passed to step 86.

At step 86, software 8 determines whether one or more attachments are part of e-mail notification package 12. If the answer is yes, control is passed to step 90.

At step 90, software 8 determines whether the attachments, which in the preferred embodiment correspond to software packages 18, have been compressed, e.g., to conserve bandwidth or to speed processing time when traversing communications interface 1. If a software package 18 has been compressed, it is decompressed at step 90. Control is then passed to step 91.

At step 91, software 8 deploys software package 18 within client computer 4.

If step 86 determines that an attachment is not part of e-mail notification package 12, control is passed to step 87, in which software 8 determines whether communications interface 1 comprises the Internet. If so, control is passed to Internet utility 88. Utility 88 may be, for example, as described in the aforesaid U.S. patent application Ser. No. 08/664,388. The system and method described in said patent application resemble those embodied in a software feature known as LiveUpdate, which is part of the commercially successful software known as Norton AntiVirus. Utility 88 automatically sends a message to server computer 2 requesting that software package(s) 18 as identified in notification package 12 be sent to client computer 4. Server computer 2 having been programmed to comply with this request, then automatically pushes the software package(s) 18 to client computer 4.

If communications interface 1 does not comprise the Internet, push/pull utility 89 is invoked. Utility 89 performs an automatic and fast transfer and installation of software package(s) 18 via a network UNC (Universal Naming Convention). No FTP (File Transfer Protocol) or other Internet connection is required. In an embodiment of the present invention that has been built, utility 89 is only 60K bytes in size. It works in conjunction with packages 204 and 214 of the aforesaid U.S. patent application Ser. No. 08/664, 388. Since UNC rather than FTP is used to install the package 204, 214 directly, the process is very efficient for users with fast network connections.

When utility 88 or utility 89 has completed its assigned tasks, control is passed to decompression step 90 as before.

FIG. 5 illustrates a more general embodiment of the present invention in which other notification transports 16, 17 can be used in conjunction with or in addition to e-mail notification transport 15. FIG. 5 illustrates an embodiment in which e-mail notification transport 15, UNC notification transport 16, and opportunistic transport 17 are all present within the same agent software 8. Alternatively, any particular agent software 8 that is in the system can contain just one or two of the varying types of notification transports 15, 16, 17. Similarly, an e-mail notification package 12, UNC notification package 13, and opportunistic notification package 14 could all be present within the same server computer 2 or within two or more different server computers 2.

UNC notification package 13 and opportunistic notification package 14 are analogous to e-mail notification package 12. Similarly, UNC notification transport 16 and opportunistic notification transport 17 are analogous to e-mail notification transport 15.

In the case where a Windows operating system is used, each type of transport 15, 16, 17 typically comprises a DLL (Dynamic Link Library). DLL's 15, 16, and 17 become active when the associated agent software 8 becomes active.

E-mail notification has previously been described in conjunction with FIGS. 2, 3, and 4.

In the case of UNC notification, once UNC notification package 13 is generated by server computer 2, UNC DLL 16 examines package 13 and determines whether it contains notification of a new version of a software package 18 beyond what has already been installed within the associated client computer 4. This may be done, for example, by DLL 16 examining date and time fields associated with software currently residing within client computer 4, and comparing these date and time fields with corresponding fields within notification package 13. If DLL 16 determines that package 13 contains notification of a new software package 18, the contents of UNC notification package 13 are transmitted to DLL 16. DLL 16 then typically invokes push/pull utility 89 to command server computer 2 to automatically push the software package 18 to client computer 4, as described above in conjunction with e-mail notification.

Opportunistic notification works by means of opportunistic transport 17 constantly watching (patrolling) a pre-designated segment of communications interface 1. When a new connection is made to this pre-designated segment of communications interface 1 via a link 3, DLL 17 checks to see whether a new software package 18 is being offered. This can be done, for example, by DLL 17 examining date and time fields associated with software currently residing within client computer 4, and comparing these date and time fields with corresponding fields within opportunistic notification package 14. When a new software package 18 is detected, DLL 17 typically invokes push/pull utility 89 to command server computer 2 to automatically push the software package 18 to client computer 4, as described above in conjunction with e-mail notification.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for deploying a software package on at least one client computer over a communications interface, said method comprising the steps of:

receiving a trigger at a server computer, wherein the trigger is a message that is received in response to a preprogrammed event;

in response to receiving the trigger, generating within the server computer a notification package;

sending the notification package over the communications interface to the at least one client computer;

recognizing the notification package by means of a notification transport located within the at least one client computer;

determining at the client computer whether the communications interface comprises the Internet;

in response to a determination that the communications interface comprises the Internet, automatically retrieving at the client computer the software package from the server computer by means of an Internet module;

in response to a determination that the communications interface does not comprise the Internet, automatically retrieving at the client computer the software package from the server computer by means of a universal naming convention (UNC) push/pull module; and deploying the software package on the client computer.

2. The method of claim 1 wherein the receiving step comprises the substep of determining whether the trigger is a push trigger.

3. The method of claim 2 wherein the receiving step further comprises the substeps of authenticating and validating the push trigger.

4. The method of claim 1 wherein the sending step comprises the substeps of:

sending a plurality of notification packages from the server computer to a plurality of client computers, wherein the sending of at least one notification package is delayed in order to avoid overloading the communications interface.

5. The method of claim 1 wherein at least one notification package is selected from the group consisting of a universal naming convention (UNC) notification package and an opportunistic notification package.

6. The method of claim 1 wherein at least one notification transport is a universal naming convention (UNC) transport.

7. The method of claim 1 wherein at least one notification transport is an opportunistic transport.

8. The method of claim 1 wherein the recognizing step comprises the substeps of:
- determining at the client computer whether the notification package contains the software package as an attachment; and
- in response to a determination that the notification package contains the software package as an attachment, deploying the software package within the client computer.

9. A system for deploying a software package on at least one client computer over a communications interface, said system comprising:
- at least one server computer, each server computer linked to the communications interface and to the software package to be deployed, and each server adapted to receive a push trigger comprising a message that is received in response to a preprogrammed event;
- at least one client computer, each client computer linked to the communications interface, each client computer adapted to deploy the software package when received from the server computer; and
- a notification transport located within each client computer, said notification transport adapted to recognize a notification package generated by a server computer in response to a push trigger, the notification transport further adapted to determine at the client computer whether the communications interface comprises the Internet, automatically retrieve at the client computer the software package from the server computer by means of an Internet module when the communications interface comprises the Internet, and automatically retrieve at the client computer the software package from the server computer by means of a universal naming convention (UNC) push/pull module if the communications interface does not comprise the Internet.

10. The system of claim 9 wherein at least one notification package is selected from the group consisting of a universal naming convention (UNC) notification package and an opportunistic notification package.

11. The system of claim 9 wherein at least one notification transport is a universal naming convention transport.

12. The system of claim 9 wherein at least one notification transport is an opportunistic transport.

13. A computer-readable medium containing a computer program that performs a method for deploying a software package on at least one client computer over a communications interface, said method comprising the steps of:
- receiving a trigger at a server computer, wherein the trigger is a message that is received in response to a preprogrammed event;
- in response to receiving the trigger, generating within the server computer a notification package;
- sending the notification package over the communications interface to the at least one client computer;
- recognizing the notification package by means of a notification transport located within the at least one client computer;
- determining at the client computer whether the communications interface comprises the Internet;
- in response to a determination that the communications interface comprises the Internet, automatically retrieving at the client computer the software package from the server computer by means of an Internet module;
- in response to a determination that the communications interface does not comprise the Internet, automatically retrieving at the client computer the software package from the server computer by means of a universal naming convention (UNC) push/pull module; and
- deploying the software package on the client computer.

* * * * *